United States Patent
Withanawasam et al.

(10) Patent No.: US 7,208,940 B2
(45) Date of Patent: Apr. 24, 2007

(54) 360-DEGREE MAGNETORESISTIVE ROTARY POSITION SENSOR

(75) Inventors: Lakshman S. Withanawasam, Maple Grove, MN (US); Hong Wan, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 158 days.

(21) Appl. No.: 10/706,149

(22) Filed: Nov. 12, 2003

(65) Prior Publication Data

US 2004/0095131 A1    May 20, 2004

Related U.S. Application Data

(63) Continuation-in-part of application No. 10/002,454, filed on Nov. 15, 2001, now Pat. No. 6,707,293.

(51) Int. Cl.
*G01B 7/30* (2006.01)
*G01R 33/06* (2006.01)

(52) U.S. Cl. .................. 324/207.25; 324/207.21; 324/252

(58) Field of Classification Search ............. 324/207.2, 324/251, 207.25, 207.21, 252
See application file for complete search history.

(56) References Cited

U.S. PATENT DOCUMENTS

| | | | |
|---|---|---|---|
| 4,283,679 A | 8/1981 | Ito et al. ................... 324/165 |
| 4,712,064 A | 12/1987 | Eckardt et al. ........ 324/207.12 |
| 4,728,950 A | 3/1988 | Hendrickson et al. . 340/870.31 |
| 5,497,082 A | 3/1996 | Hancock ................. 324/207.14 |
| 5,659,249 A * | 8/1997 | Kawamoto ................... 324/251 |
| 5,736,852 A | 4/1998 | Pattantyus ................... 324/166 |
| 5,880,586 A | 3/1999 | Dukart et al. ............. 324/207.2 |
| 5,952,825 A | 9/1999 | Wan ........................... 324/252 |
| 6,064,197 A | 5/2000 | Lochmann et al. ..... 324/207.14 |
| 6,198,275 B1 | 3/2001 | Wolf et al. ............ 324/207.12 |
| 6,212,783 B1 | 4/2001 | Ott et al. ..................... 33/1 PT |
| 6,326,781 B1 | 12/2001 | Kunde ..................... 324/207.21 |
| 6,355,998 B1 | 3/2002 | Schob et al. ............... 310/68 B |
| 6,707,293 B2 * | 3/2004 | Wan et al. ............. 324/207.25 |
| 2003/0090265 A1 | 5/2003 | Wan et al. ............. 324/207.25 |

OTHER PUBLICATIONS

International Search Report, PCTUS2004/037297.

* cited by examiner

*Primary Examiner*—Reena Aurora
(74) *Attorney, Agent, or Firm*—McDonnell Boehnen Hulbert & Berghoff LLP (57) ABSTRACT

A 360-degree magnetoresistive rotary position sensor comprises a magnetic linear sensor and a magnetic angular sensor, formed on a semiconductor substrate. The linear sensor detects a sense of a magnetic field, and the angular sensor detects an angular position of the magnetic field up to 180-degrees. With the linear sensor indicating that a positive sense of the magnetic field is detected, the angular sensor detects a first 180-degrees of angular position. With the linear sensor indicating that a negative sense of the magnetic field is detected, the angular sensor detects a second 180-degrees of angular position. As a result, the position sensor detects a full 360 degrees of rotation.

13 Claims, 7 Drawing Sheets

360-DEGREE MAGNETORESISTIVE ROTARY POSITION SENSOR

RELATED REFERENCE

This patent application is a continuation-in-part of patent application Ser. No. 10/002,454, now U.S. Pat. No. 6,707,293, entitled a "360-Degree Rotary Position Sensor" filed Nov. 15, 2001, and listing as inventors Hong Wan and Tamara Bratland. The entirety of patent application Ser. No. 10/002,454 is hereby incorporated by reference.

FIELD OF INVENTION

The present invention relates generally to position sensors, and more particularly, relates to a 360-degree magnetoresistive rotary position sensor.

BACKGROUND

The Earth, magnets, and electrical currents generate magnetic fields. Magnetoresistive (MR) sensors are magnetic sensors that are sensitive to the magnetic field. The MR sensors typically have a thin strip of ferromagnetic material, such as a nickel-iron alloy (also known as Permalloy), through which a current is passed. In the presence of the magnetic field, the thin strip changes resistance, which causes a voltage measured across the thin strip to change.

A magnetic linear sensor is one example of the MR sensor. The linear sensor typically has a magnetic axis that provides a reference point with respect to which a sense of the magnetic field is detected. The sense of the magnetic field is an indication of whether the magnetic field is in a direction along the magnetic axis of the linear sensor, in which case the linear sensor is said to detect a positive sense, or in a direction opposite to the magnetic axis of the linear sensor, in which case the linear sensor is said to detect a negative sense. The positive sense may be the north pole of the magnetic field, and the negative sense may be the south pole of the magnetic field, but other arrangements are also possible. The linear sensor will output a voltage indicative of the sense of the magnetic field.

A magnetic angular sensor is another example of an MR sensor. The angular sensor typically has two magnetic axes arranged at a forty-five degree angle between each other that cooperatively provide a reference point with respect to which an angular position of the magnetic field is detected. The angular sensor will output a voltage indicative of the angular position of the magnetic field, up to a range of 180-degrees.

In addition to the linear sensor and angular sensor, MR sensors that are capable of detecting 360-degrees of rotation are desirable. Such MR sensors can be used for many rotary applications, such as for control of an automobile steering wheel. Therefore, it would be desirable to have a 360-degree MR rotary position sensor that is robust and highly accurate.

SUMMARY

A 360-degree MR rotary position sensor comprises a magnetic linear sensor and a magnetic angular sensor, integrated on a common semiconductor substrate. The linear sensor on the common semiconductor substrate detects the sense of a magnetic field, and the angular sensor on the common semiconductor substrate detects an angular position of the magnetic field up to 180-degrees. Cooperatively, the linear sensor and the angular sensor may detect the angular position of the magnetic field up to 360-degrees.

A voltage output by the linear sensor may be indicative of the sense of the magnetic field, and a voltage output by the angular sensor may be indicative of an angular position of the magnetic field. If the linear sensor detects a positive sense of the magnetic field, then the angular sensor may detect a first 180-degrees of rotation. If the linear sensor detects a negative sense of the magnetic field, then the angular sensor may detect a second 180-degrees of rotation. Logic may be coupled to the 360-degree MR rotary position sensor that functions to measure voltages output by the linear sensor and the angular sensor, and provide an indication of the angular position of the magnetic field to 360-degrees.

Either a magnet or the 360-degree MR rotary position sensor may be mounted on a rotating shaft. The rotating shaft may be a steering wheel. The 360-degree rotary position sensor is located substantially close to the magnet, so that the 360-degree MR rotary position sensor is capable of detecting the magnetic field produced by the magnet. The 360-degree MR rotary position sensor may measure the angular position of the magnetic field to 360-degrees, and thus the angular position of the rotating shaft to 360-degrees.

These as well as other aspects and advantages will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 6 is an exemplary graphical representation of an output of the linear sensor.

DETAILED DESCRIPTION OF AN EXEMPLARY EMBODIMENT

1. Exemplary Layout

Figure 1:
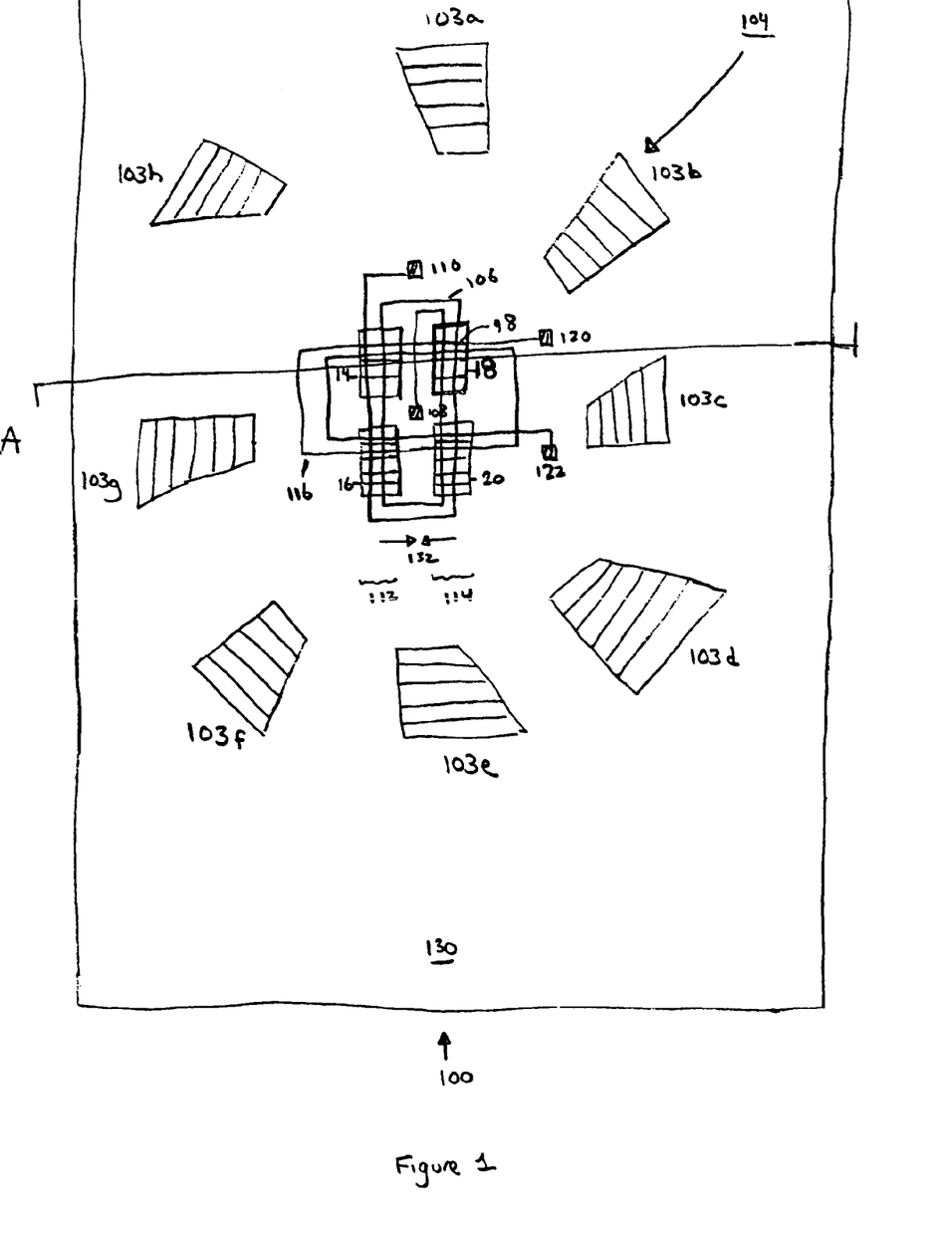
FIG. 1 is a layout of a 360-degree MR rotary position sensor.

FIG. 1 shows an exemplary layout of a 360-degree rotary position sensor 100, in accordance with an exemplary embodiment of the present invention. The position sensor 100 shown in FIG. 1 is not drawn to scale, but rather is an approximation of the position sensor 100. The position sensor 100 includes a magnetic linear sensor 102 and a magnetic angular sensor 104 formed on a semiconductor substrate 130. The linear sensor 102 may be coaxially located on the semiconductor substrate 130 with respect to the angular sensor 104, but other arrangements are also possible.

The linear sensor 102 may detect the sense of a magnetic field. The linear sensor 102 may include four magnetoresistive elements 14, 16, 18, and 20 composed of a ferromagnetic film patterned as resistive strips 98 electrically connected in series on the semiconductor substrate 130. A magnetic field applied to the film, causes the resistance in at least one magnetoresistive element to change. The change in resistance is indicative of the sense of the magnetic field.

The angular sensor 104 may measure angular position of a magnetic field. The angular sensor 104 may include eight magnetoresistive elements 103a–h. The magnetoresistive elements 103a–h may also be composed of a ferromagnetic film patterned as resistive strips electrically connected in series on the semiconductor substrate 130. The resistivity of at least one magnetoresistive element 103a–h may change with respect to the angle of the magnetic field, and the change in resistance of the at least one magnetoresistive element 103a–h may be indicative of the angular position of the magnetic field, up to a range of 180-degrees.

A set-reset strap conductor 106 may be connected between pads 108, 110. The conductor 106 may be in the form of a spiral that extends in a clockwise direction between pads 108, 110. Segments 112 of the conductor 106 may pass above magnetoresistive elements 14, 16 and segments 114 of the conductor 106 may pass above magnetoresistive elements 18, 20. With a current entering pad 108 and leaving at pad 110, the current in segment 114 will cause a magnetization in elements 18, 20 in a direction 132 toward a central part of the substrate 130, and the current in segment 112 will cause magnetization in elements 14, 16 in a direction 132 toward the central part of the substrate 130. When the current is reversed, the current in segment 114 will cause magnetization in elements 18, 20 in a direction opposite to direction 132, and the current in segment 112 will cause magnetization in elements 14, 16 in a direction opposite to the direction 132.

Offset strap conductor 116 generates a magnetic field in a sensitive direction of the magnetoresistive elements. The sensitive direction is a direction of the magnetic field that causes maximum change in resistance of the magnetoresistive elements 14, 16, 18, 20. The conductor 116 extends from pad 120 to pad 122 and current may flow through the offset strap conductor 116 from pad 120 to pad 122, or vice versa. The conductor 116 may be formed on the position sensor 100 such that the offset step conductor is parallel to the resistive strips 98 when the offset strap conductor 116 passes over the magnetoresistive elements 14, 16, 18, 20 and the current flows in a same direction through the conductor 116 when passing over the magnetoresistive elements 14, 16, 18, 20. Other arrangements are also possible.

Background information on MR sensors and details of the formation of the magnetoresistive elements on the substrate 130 is described in U.S. Pat. No. 4,847,584, issued Jul. 11, 1989, and is hereby incorporated by reference in its entirety. U.S. Pat. No. 5,952,825, issued Sep. 14, 1999, provides background information on the use of an integrated magnetic field sensing device, and is hereby incorporated by reference in its entirety, as well.

Figure 2:
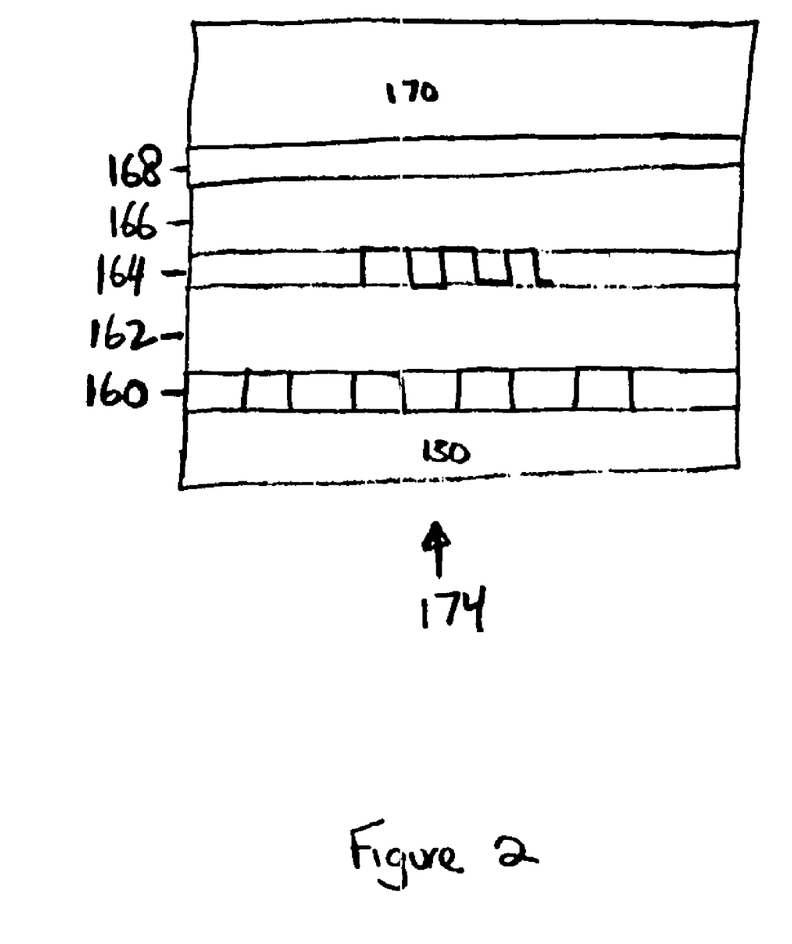
FIG. 2 is a cross-sectional view of the position sensor.

FIG. 2 shows a greatly enlarged cross-sectional view 174 of the position sensor 100 of FIG. 1 along section A. Like the layout of FIG. 1, the cross-sectional view 174 of the position sensor 100 is not drawn to scale, but rather is an approximation of the cross-sectional view.

The cross-sectional view 174 includes a substrate layer 130, a magnetoresistive strip layer 160, first dielectric layer 162, a set-reset strap conductor layer 164, a second dielectric layer 166, an offset strap conductor layer 168, and a passivation layer 170.

The semiconductor substrate 130 may consist of silicon, and the magnetoresistive strip layer 160 may consist of a nickel-iron alloy (also known as Permalloy). The magnetoresistive strip layer 160 may define the magnetoresistive elements 14, 16, 18, 20, 103a–h. On top of the magnetoresistive strip layer 160 may be a dielectric layer 162 made of a material such as silicon dioxide, followed by the set-reset strap-conductor layer 164.

As shown in FIG. 1, the set-reset strap conductor 106 may pass over the top of the magnetoresistive elements 14, 16, 18, 20 of the linear sensor 102, but might not pass over the top of the magnetoresistive elements 103a–h of the angular sensor 104. Accordingly, structure of the set-reset strap conductor layer 164 may vary through the cross-section 174.

Formed on top of the set-reset strap conductor layer 164 is the second dielectric layer 166, and the offset strap conductor layer 168. The offset strap conductor layer 168 defines the structure for the offset strap conductor 116. Above the offset strap layer is a passivation layer 170. The passivation layer 170 prevents oxidation of the offset strap conductor layer 168.

The relative locations of the layers containing sensing elements 102, 104, the set-reset strap conductor 106, and the offset strap conductor 116 may be varied. The arrangement of layers in the cross-sectional view 174 is exemplary in nature and other arrangements are also possible provided that attention is given to the magnetic field produced by the straps.

Figure 3:
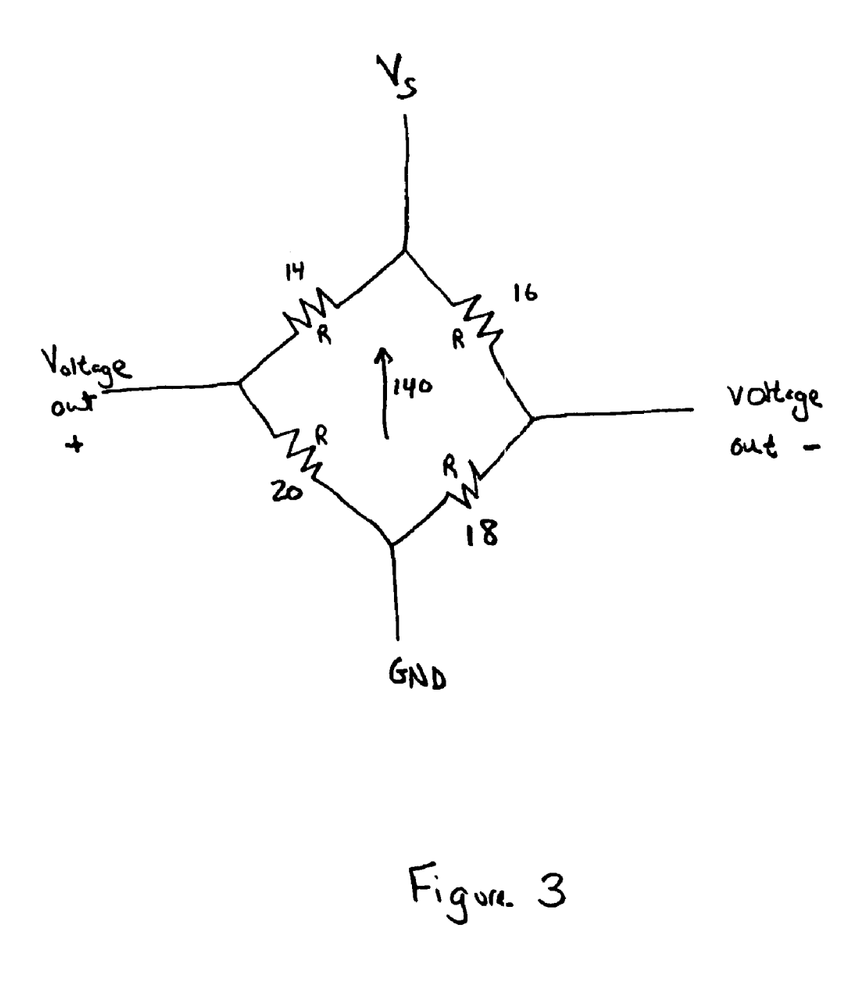
FIG. 3 is an electrical schematic for a linear sensor.

FIG. 3 is an electrical schematic of the linear sensor 102. The electrical schematic of the linear sensor 102 may take the form of a single Wheatstone bridge, with a voltage Vs applied to the bridge. Resistors (R) in the Wheatstone bridge may represent the magnetoresistive elements 14, 16, 18, and 20. The resistors may change in resistance depending on the magnetic field, and the change in resistance may be detected by measuring the voltage output by the Wheatstone bridge. The voltage is indicative of the sense of the magnetic field.

The Wheatstone bridge of the linear sensor 102 may have a magnetic axis 140. The magnetic axis 140 may be in a plane of the ferromagnetic film patterned on the semiconductor substrate 130 and provide a reference point with respect to which the sense of the magnetic field is detected. A magnetic field in a direction along the magnetic axis 140 is typically referred to as a positive sense and the magnetic field in a direction opposite to the magnetic axis 140 is referred to as a negative sense.

Figure 4:
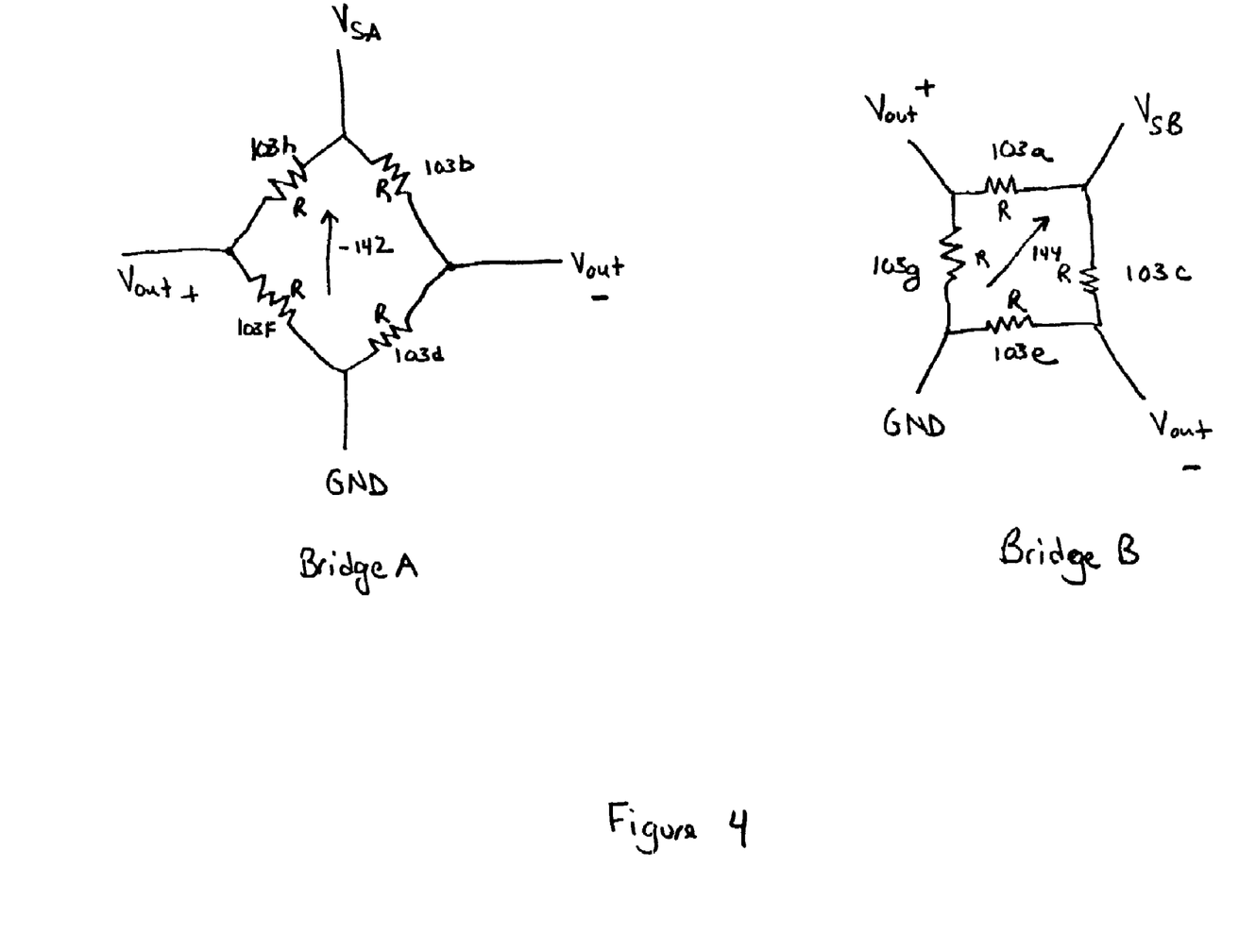
FIG. 4 is an electrical schematic for an angular sensor.

FIG. 4 is an electrical schematic of the angular sensor 104. The electrical schematic of the angular sensor 104 may take the form of two Wheatstone bridges, Bridge A and Bridge B, coexisting on the semiconductor substrate 130. Bridge A may be physically rotated by 45 degrees from Bridge B. The magnetoresistive elements 103a–h of the angular sensor 104 are illustrated in the electrical schematic as resistors. The resistors change in resistance depending on a direction of a magnetic field. The change in resistance may be detected by measuring the voltage output by the two bridges, when a voltage source $Vs_a$ is applied to Bridge A and a voltage source $Vs_b$ is applied to Bridge B. The voltages output are indicative of the angular position of the magnetic field.

The angular sensor 104 may have magnetic axes 142, 144 that are defined by the sensor design. The magnetic axes 142, 144 may be in a plane of the ferromagnetic film patterned on the semiconductor substrate 130 and separated by forty-five degrees, but other arrangements are also possible.

The semiconductor substrate 130 illustrated in FIGS. 1 and 2, on which the linear sensor 102 and angular sensor 104 are formed, might be produced in an integrated circuit process. The linear sensor 102 and the angular sensor 104 may be oriented in a variety of ways with respect to each other on the semiconductor substrate 130. Preferably, however, the angular sensor 104 and the linear sensor 102 may be oriented on the semiconductor substrate 130 such that the magnetic axis 140 of the linear sensor is perpendicular to one of the magnetic axes 142, 144 of the angular sensor 104.

Additionally, the exemplary embodiment describes the linear sensors 102 and the angular sensor 104 in terms of a four-leg Wheatstone bridge arrangement. It is to be understood, however, that two-element bridges utilizing a single current source or utilizing two current sources may be used as well.

2. Exemplary Operation

Figure 5:
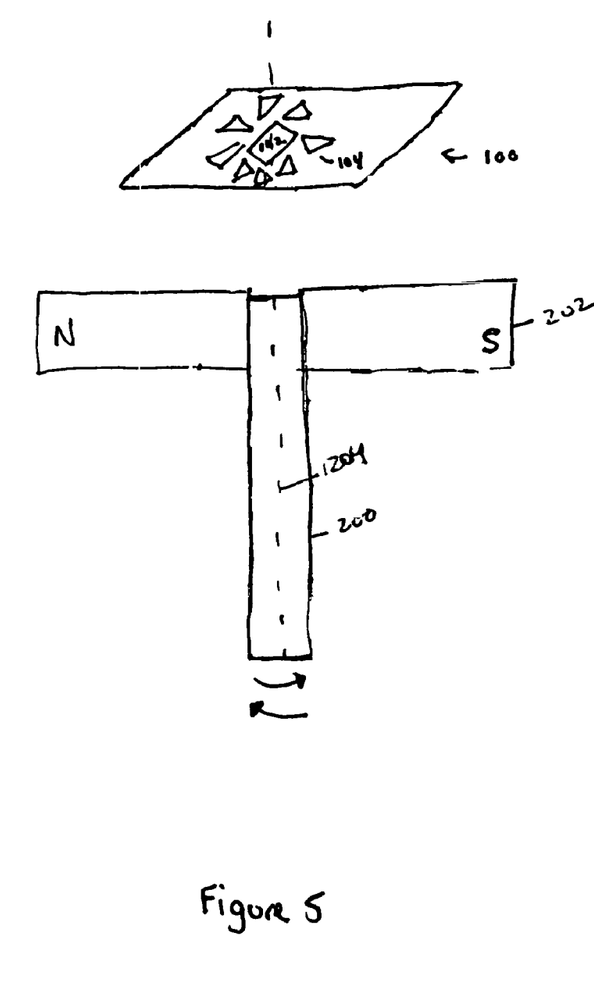
FIG. 5 is a simplified block diagram illustrating a system that employs the position sensor to sense the position of a rotating shaft to 360-degrees.

FIG. 5 is a simplified block diagram illustrating a system that employs the position sensor 100 and a magnet 202 to sense position of a rotating shaft 200 to 360-degrees. The magnet 202 may be mounted on an end of the rotating shaft 200, such as that of a rotating object. The rotating object may be a steering wheel.

The magnet 202 may be a bar magnet having a north and a south pole. Alternatively, the magnet 202 may be a disc magnet with a pair of poles. Other magnet configurations that provide at least two poles and a substantially uniform magnetic field near the position sensor 100 may also be employed.

The magnet 202 may be composed of a ferromagnetic material. The magnet 202 may be composed of, for example, neodymium iron boron (NdFeB), samarium cobalt (SmCo), Alnico, or ceramic ferrite. The choice of the magnet 202 may be based on cost, size, distance between magnet 202 and position sensor 100, distance between the magnet 202 and the position sensor 100, maximum magnetic energy, and maximum operating temperature, among other criteria.

An operating plane may be an imaginary plane perpendicular to an axis of rotation 204. The axis of rotation 204 may be defined as an imaginary line passing through the rotating shaft 200. The position sensor 100 may be located substantially at a center of the axis of rotation of the rotating shaft 202 and parallel to the operating plane.

There may be a gap substantially between the position sensor 100 and the magnet 202. The minimum gap may be determined by mechanical clearance and tolerance, while the maximum gap may be determined by the strength of the magnetic field. The strength of the magnetic field at the position sensor 100 may have to exceed a minimum field requirement so that the linear sensor 102 and the angular sensor 104 can follow the magnetic field. The strength of the magnetic field at the position sensor 100 may be preferably 40–100 gauss, but the position sensor 100 may be operable with a magnetic field less than 40 gauss or greater than 100 gauss.

In FIG. 5, the magnet 202 is mounted on the rotating shaft 200, the magnet 202 rotates with the rotating shaft 200, and the position sensor 100 remains stationary in the operating plane. Other arrangements, however, are also possible. For instance, the position sensor 100 might be mounted on the rotating shaft 200, while the magnet 202 may be located in the operating plane. This arrangement also enables the position sensor 100 to determine the angular position of the rotating shaft to 360-degrees.

The linear sensor and the angular sensor may output voltages indicative of the sense of the magnetic field and an angular position of the magnetic field, respectively.

FIG. 6 shows an exemplary graphical representation of the voltage output by the linear sensor 102. The voltage output by the linear sensor 102 may be indicative of the sense of the magnetic field. A positive sense could be an indication that a north pole of the magnetic field is detected, and a negative sense could be an indication that a south pole of the magnetic field is detected, but other arrangements are also possible.

The voltage output by the linear sensor 102 may span a voltage range. For example, in FIG. 6, the voltage output may span a range from −42 mV to +42 mV. If the voltage output by the linear sensor 102 is greater than zero volts, then the voltage output indicates that a positive sense is detected. On the other hand, if the voltage output by the linear sensor 102 is less than zero volts, then the voltage indicates that a negative sense is detected. Zero volts may be a decision point for whether a positive sense or negative sense is detected.

The range of voltage output by the linear sensor 102, and the voltage indicative of the sense, may take other forms depending on the voltage source $V_s$ employed by the linear sensor 102 and the design of the linear sensor 102. For example, a voltage output by the linear sensor 102 greater than zero volts may indicate that a negative sense is detected, and the voltage output by the linear sensor 102 less than zero volts may indicate that a positive sense is detected. Other arrangements are also possible.

Figure 7:
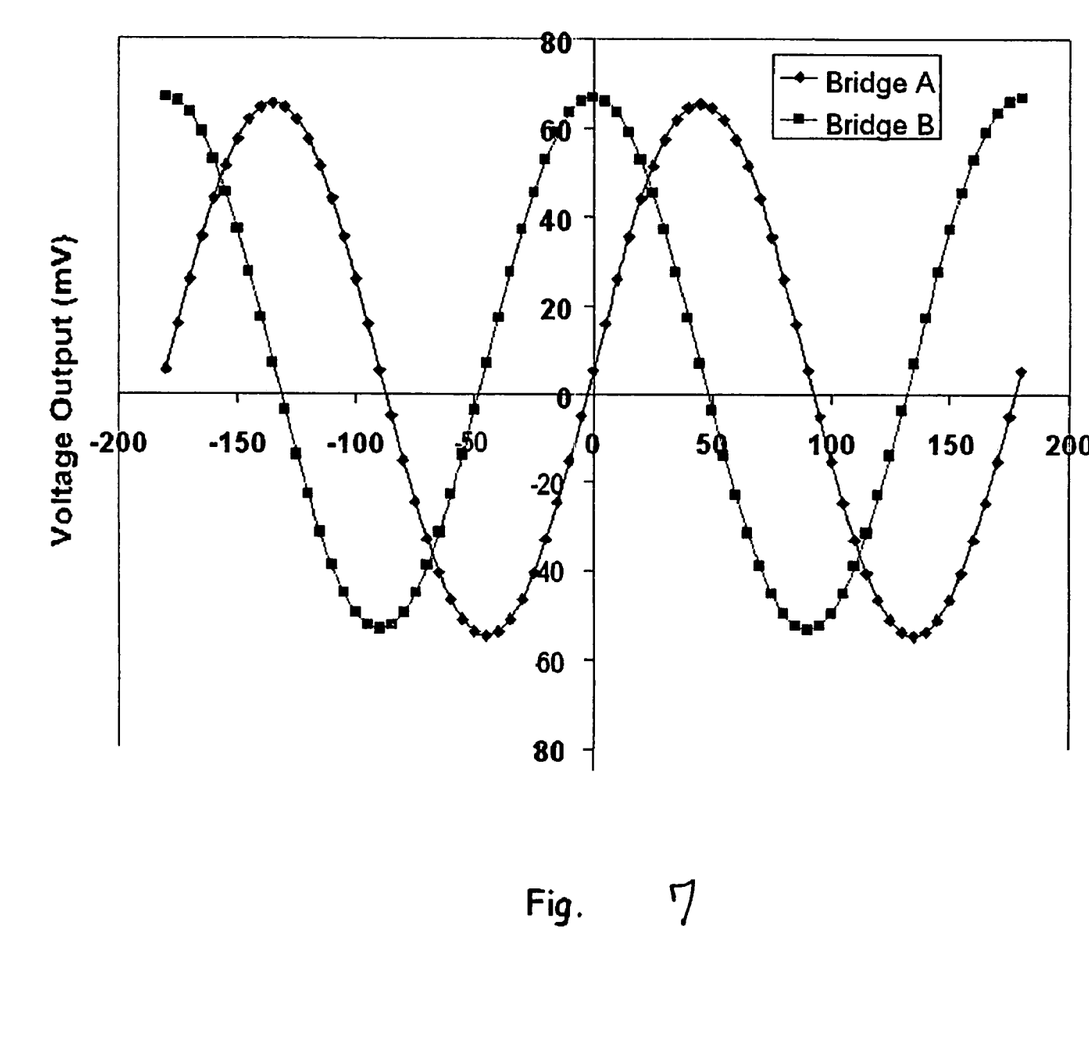
FIG. 7 is an exemplary graphical representation of an output of the angular sensor.
Figure 9:
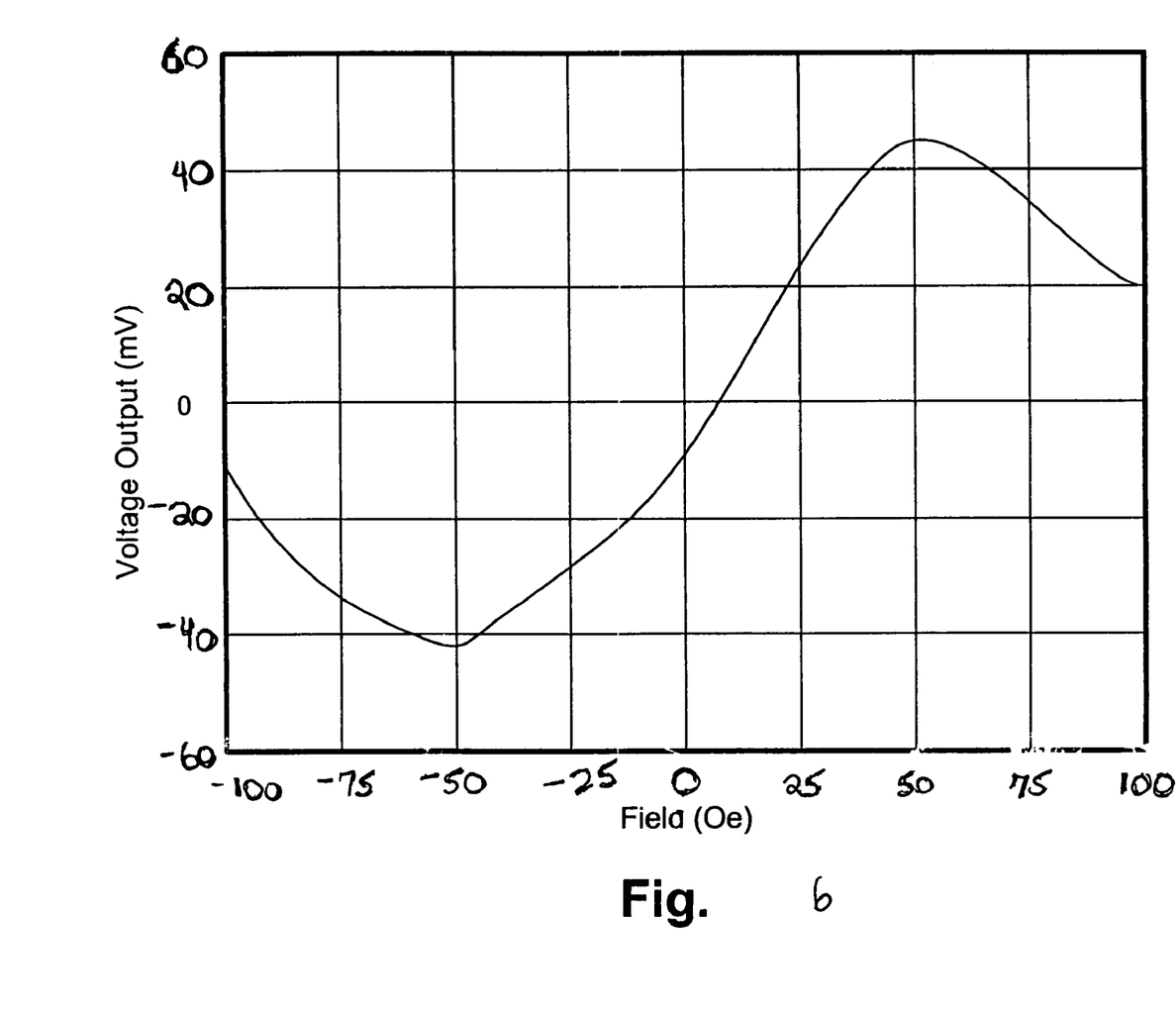

FIG. 7 shows an exemplary graphical representation of the voltages output by the angular sensor 104. The angular sensor 104 may produce sinusoidal voltages output in response to the magnetic field. The sinusoidal voltages output may be indicative of the angular position of the magnetic field, to 180-degrees. As noted above, the angular sensor 104 includes Bridge A and Bridge B. The voltages output by Bridge A and Bridge B may span, for example, from −55 mV to +65 mV, and the midpoint of the voltage range may be 5 mV.

The following formulas represent the voltages output at the Bridges A and B:

Bridge A, $V_a = A \sin(2\theta) + V_{aoff}$

Bridge B, $V_b = A \cos(2\theta) + V_{boff}$

"A" is a constant that is determined by the materials of the magnetoresistive elements 104 and angle $\theta$ represents the angular position of a magnetic field sensed, and offsets $V_{aoff}$ and $V_{boff}$, are midpoints of the range of voltages output by Bridges A and B, respectively.

Logic integrated onto the semiconductor substrate 130 of the position sensor 100 or coupled to the semiconductor substrate 130 of position sensor 100 may function to determine from the voltage output by the linear sensor 102 and the voltages output by the angular sensor 104, the angular position of the applied magnetic field, to 360-degrees. The logic may take the form of combinatorial logic, computer instructions stored in memory and executable by a processor (e.g., microcontroller), or some other type of mechanism.

The logic may implement the following formulas and definitions to derive the angular position of the applied magnetic field, and thus the angular position of the rotating shaft 200 to 360-degrees:

$X = V_a - V_{aoff}$ and $Y = V_b - V_{boff}$ $X > 0$ and $Y > 0$; $\theta = 0 + 0.5 * \arctan(|X|/|Y|) + \alpha$ $X > 0$ and $Y < 0$; $\theta = 45 + 0.5 * \arctan(|X|/|Y|) + \alpha$ $X < 0$ and $Y < 0$; $\theta = 90 + 0.5 * \arctan(|X|/|Y|) + \alpha$ $X < 0$ and $Y > 0$; $\theta = 135 + 0.5 * \arctan(|X|/|Y|) + \alpha$ Where: $V_a$ is the voltage output of Bridge A,
$V_{aoff}$ is the offset voltage of Bridge A, $V_b$ is the voltage output of Bridge B,
$V_{boff}$ is the offset voltage of Bridge B.
and α=0 if a positive sense of the magnetic field is detected by the linear sensor 102 (0 to 180 degrees) and α=180 if a negative sense of the magnetic field is detected by the linear sensor 102 (180 to 360 degrees).

The logic may function to compare the voltage output by the linear sensor 102 to the decision point indicative of the sense of the magnetic field, to determine the sense of the magnetic field, and the value of α.

For example, if the voltage output by the linear sensor 102 is greater than the decision point, then the logic may function to determine that a positive sense of the magnetic field is detected. Alternatively, if the voltage output by the linear sensor 102 is less than the decision point, then the logic may function to determine that a negative sense of the magnetic field is detected. The logic would function to add 180 degrees to the angular position of the magnetic field, as also determined the by logic, to determine the angular position to 360 degrees. The angle range may be expressed in any manner that would incorporate 360-degrees, such as zero to 360-degrees, or the +180-degrees to −180-degrees.

Exemplary embodiments of the present invention have thus been illustrated and described. It will be understood, however, that changes and modifications may be made to the invention as described without deviating from the spirit and scope of the invention, as defined by the following claims.

What is claimed is:

1. A 360-degree rotary position sensor system comprising:
a semiconductor substrate having:
   (a) a magnetoresistive angular sensor operable to generate an output representative of an angular position of a magnetic field to 180-degrees; and
   (b) a magnetoresistive linear sensor operable to generate an output representative of a sense of the magnetic field, wherein the magnetoresistive angular sensor and the magnetoresistive linear sensor are formed on the semiconductor substrate to generate a 360-degree angular position of a magnetic field sensed by the 360-degree rotary position sensed system.

2. The system of claim 1, further comprising logic that functions to determine from (i) the output representative of the angular position of the magnetic field; and (ii) the output representative of the sense of the magnetic field, an angular position of the magnetic field to 360-degrees.

3. The system of claim 2,
wherein a magnet is mounted on a rotating shaft; and
wherein the angular position of the magnetic field to 360-degrees is indicative of an angular position of the rotating shaft.

4. The system of claim 2,
wherein the semiconductor substrate is mounted on a rotating shaft; and
wherein the angular position of the magnetic field to 360-degrees is indicative of an angular position of the rotating shaft.

5. The system of claim 1, wherein the magnetoresistive linear sensor is coaxiallly located on the semiconductor substrate with respect to the magnetoresistive angular sensor.

6. The system of claim 1, wherein the semiconductor substrate is located substantially close to a magnet so that the magnetoresistive linear sensor and the magnetoresistive angular sensor detect the magnetic held of a magnet.

7. The system of claim 6, wherein the magnet is selected from the group consisting of a bar magnet and a disc magnet.

8. The system of claim 6, wherein the magnet is composed of a material selected from the group consisting of neodymium iron boron (NdFeB), samarium cobalt (SmCo), Alnico, and ceramic ferrite.

9. The system of claim 1, wherein a magnetic axis of the magnetoresistive linear sensor is aligned with at least one magnetic axis of the magnetoresistive angular sensor.

10. A 360-degree rotary position sensor system, comprising in combination:
   (a) a semiconductor substrate having:
      (1) a magnetoresistive angular sensor operable to generate an output represenative of an angular position of a magnetic field with an angle range of 180-degrees;
      (2) a magnetoresistive linear sensor operable to generate output representative of a sense of the magnetic field;
   wherein (i) the linear sensor is coaxially located with respect to the angular sensor, and (ii) the semiconductor substrate is located substantially parallel to a magnet mounted on a rotating shaft, wherein a gap is located substantially between the semiconductor substrate and the magnet; and (iii) the magnetoresistive angular sensor and the magnetoresistive linear sensor are formed on the semiconductor substrate; and
   (b) logic that functions to determine, based on the output representative of the angular position and the output representative of the sense, an output representative of an angular position of the magnetic field with an angle range of 360-degrees.

11. A method for determining an angular position of a rotating shaft to 360-degrees, the method comprising:
positioning, substantially close to a magnet, a semiconductor substrate having a magnetoresistive angular sensor and a magnetoresistive linear sensor, wherein the angular sensor is operable to generate an output representative of an angular position of a magnetic field with an angle range of 180-degrees; and wherein the magnetoresistive linear sensor is operable to generate an output representative of a sense of the magnetic field and wherein the magnetoresistive linear sensor and magnetoresistive angular sensor are formed on a semiconductor substrate; and
determining, from the outputs of the angular sensor and the linear sensor, an angular position of the magnetic field with an angle range of 360-degrees,
whereby the angular position of the magnetic field with the angle range of 360-degrees is indicative of the angular position of the rotating shaft.

12. The method of claim 11, wherein determining the angular position of the magnetic field with the angle range of 360-degrees comprises adding 180-degrees to the output representative of the angular position of the magnetic field, based on detecting a sense of the magnetic field selected from the group consisting of a positive sense and a negative sense.

13. The method of claim of 11, wherein positioning the semiconductor substrate comprises mounting the semiconductor substrate on a rotating shaft.

* * * * *